T. LEYTHAM.
OPHTHALMIC MOUNTING.
APPLICATION FILED MAR. 31, 1921.

1,428,697.

Patented Sept. 12, 1922.

INVENTOR
Thomas Leytham
BY
his ATTORNEYS

Patented Sept. 12, 1922.

1,428,697

UNITED STATES PATENT OFFICE.

THOMAS LEYTHAM, OF ROCHESTER, NEW YORK, ASSIGNOR TO SHUR-ON OPTICAL CO., INC., OF ROCHESTER, NEW YORK, A CORPORATION OF NEW YORK.

OPHTHALMIC MOUNTING.

Application filed March 31, 1921. Serial No. 457,232.

*To all whom it may concern:*

Be it known that I, THOMAS LEYTHAM, a citizen of the United States, and resident of Rochester, in the county of Monroe and State of New York, have invented certain new and useful Improvements in Ophthalmic Mountings, of which the following is a specification.

The present invention relates to ophthalmic mountings and an object thereof is to provide a reinforced cellulose article in which the reinforcement acts to maintain the molded shape of the article notwithstanding the application of heat to the article. A further object of the invention is to provide a metal reinforcement in the cellulose bridge of an ophthalmic mounting, the metal reinforcement acting to maintain the shape of the bridge when the mounting is heated for the insertion of lenses. A further object of the invention is to provide an ophthalmic mounting made of a cellulose composition and having a metal reinforcement in the bridging portion which also acts to lock the lenses against turning in the lens rings or rims.

To these and other ends, the invention consists of certain parts and combinations of parts all of which will be hereinafter described, the novel features being pointed out in the appended claims.

In the drawings:—

It is well known that a cellulose composition such as pyroxylin, celluloid and the like may be molded by heating into different shapes or forms. However, should the article after being shaped or formed be reheated, the cellulose composition will tend to return to the shape which it had in the cured stock. Difficulty has heretofore been experienced in the making of ophthalmic mountings so that they will retain their molded shape when subjected to heat for the purpose of expanding the lens rings or rims for the insertion of the lenses, this being particularly true in connection with the bridge or bridging portion, which, when the lens rings are heated, tends to flatten or straighten to the original shape of the cured stock.

According to this invention, a reinforcement is arranged in an article made of a cellulose composition in such a manner that the heating of the composition after the latter has been molded will not permit the composition to assume its original form. This has been accomplished by simultaneously shaping the article and bending the reinforcement to correspond to such shape.

Figure 1:
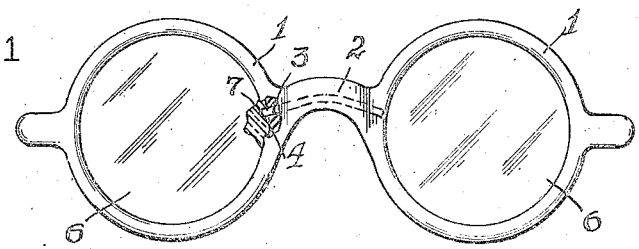
Fig. 1 is a face view of an ophthalmic mounting constructed in accordance with this invention, a part being broken away to show the manner in which the metal reinforcement acts to prevent the turning of a lens.
Figure 2:
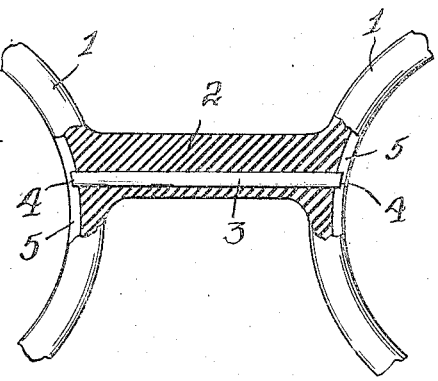
Fig. 2 is a fragmentary view, partially in section, showing the form of the bridge of the metal reinforcement before the shaping of the bridge.
Figure 4:
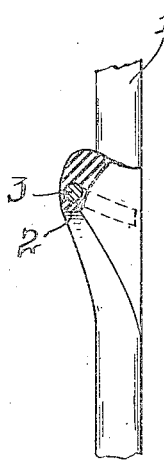
Fig. 4 is a section on the line 4—4, Fig. 3.
Figure 3:
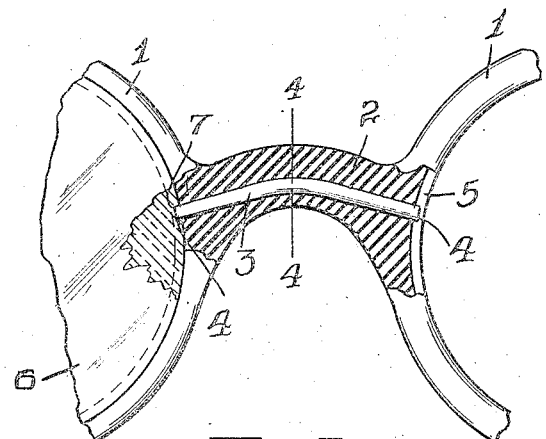
Fig. 3 is a fragmentary view with parts in section showing the bridge and reinforcement after the shaping of the latter.

Referring to the embodiment of the invention herein illustrated, 1 indicates the lens rings of an ophthalmic mounting and 2 the bridging portion, the rings and the bridging portion both being formed of a cellulose composition. In manufacturing the mounting, the rings 1 and the bridging portion 2 are cut from one piece of stock in its cured shape, the bridging portion being cut straight as shown in Fig. 2 of the drawings. While it is in this shape a reinforcement 3 in the form of a straight piece of wire is inserted in the unmolded bridging portion, this being preferably effected by heating the wire and forcing it through the bridging portion. Preferably both ends of the wire extend from opposite ends of the bridging portion at 4 into the lens receiving groove 5 of the rings or rims 1. After the wire has cooled, it will be found that the cellulose composition is formed closely about the same so that the wire lies embedded therein. The bridging portion is then formed under heat into arched form, as shown in Figs. 3 and 4, and simultaneously with said forming the reinforcement 3 is bent or arched to conform to the curve of the bridging portion 2. The reheating of the lens rings for the purpose of expanding the rings to insert the lenses 6 may now take place without causing the return of the bridging portion to its original straight form as illustrated in Fig. 2. This is due to the fact that the reinforcement is arched and will hold the bridging portion in its arched form. The lenses 6 may be notched at 7 so as to engage the projecting ends 4 of the reinforcement 3 and in this way the lenses are held against turning.

From the foregoing it will be seen that there has been provided a new method of forming an article from cellulose composition by which the article is prevented from returning to the original shape of the cured stock upon reheating. This result is secured by providing in the article a reinforcement which is bent to conform to the article simultaneously with the molding of said article through heat. This method has special advantages when employed in making the bridging portion of an ophthalmic mounting, as it tends to retain the arch shape of the bridging portion upon the reheating of the mounting for the purpose of inserting the lenses. The reinforcement is embedded in the bridging portion, conforms to the arch of said bridging portion, and may be extended at its ends into the lens receiving groove for the purpose of preventing the turning of the lenses in the lens rings.

What I claim as my invention and desire to secure by Letters Patent is:—

1. An ophthalmic mounting comprising a pair of continuous lens rings, formed of a cellulose composition, a curved bridge formed of a cellulose composition and extending from one ring to the other, and a reinforcing piece entirely surrounded by said bridge and curved to conform substantially to the curve of the bridge, so as to maintain the bridge in its curved form when the lens rings are heated for the purpose of inserting the lenses therein.

2. An ophthalmic mounting comprising lens rings, a bridge connecting said lens rings, and a reinforcing piece extending through the bridge and having its ends arranged to lock against turning lenses arranged in the rings.

3. An ophthalmic mounting comprising lens rings formed of a nonmetallic material and provided with lens receiving grooves, a bridge of nonmetallic material connecting said lens rings, and a reinforcing piece for the bridge having its ends extending into the grooves for locking lenses therein against turning.

THOMAS LEYTHAM.